Patented June 17, 1930

1,764,955

UNITED STATES PATENT OFFICE

HERMAN HEUSER, OF EVANSTON, ILLINOIS

STABILIZATION OF CEREAL BEVERAGES

No Drawing. Application filed August 13, 1928. Serial No. 299,445.

This invention relates to the stabilization of liquids containing albuminoids and particularly cereal beverages of the beer type such as beer, ale, porter and the like, containing a lawful percentage of alcohol or no alcohol at all.

The invention comprises a method whereby such beverages are prevented from becoming cloudy or forming a sediment under the influence of light, or during storage, or when chilled, and also a new composition of matter suitable for use in such method.

According to the present invention both tannin and proteolytic enzyme are added to the cereal beverage. The insoluble matter which is formed by the action of the tannin is removed by filtration, yielding a beverage which can be stored for prolonged periods under the influence of light without the production of haze or sediment even when chilled to a low temperature.

The haze or sediment which frequently forms in cereal beverages is due to a variety of causes. Apparently one cause is the pasteurizing treatment which seems to render some of the albuminoid content unstable, so that in the course of time insoluble albuminoids are formed. Another cause is the presence of heavy metals such as calcium, tin and zinc which have a precipitating action upon some of the albuminoids. These precipitating effects appear to be related to oxidation due to the presence of free oxygen in the beverage packages.

While the addition to the beverage of either tannin or proteolytic enzyme will materially aid in the solution of the difficulty with respect to development of haze or sediment, the results obtained thereby are frequently unsatisfactory because each of these expedients fails to affect some of the primary causes of haze production. Thus, tannin will expend its activities almost immediately upon the complex albuminoids which are present in the beverage at the time of this addition, including the combinations of albumenoids with calcium and other metallic salts. Consequently it has no effect upon albuminoids which are rendered unstable by pasteurization or by the lapse of time, subsequent to the tannin treatment. On the other hand the addition of proteolytic enzyme does not prevent subsequent haze formation due to heavy metal compounds such as gypsum which may be present in excessive quantities where hard waters are employed, or tin compounds which, when present in very minute quantities, are capable of forming haze.

By employing both tannin and proteolytic enzyme, all the causes of haze formation are effectively removed and a beverage of much more satisfactory quality is produced. This result can be attained with the employment of tannin and proteolytic enzyme in substantially smaller quantities than have been considered necessary when either was used alone, so that the improved method is highly economical while yielding results greatly superior to those heretofore attained.

By the term "tannin" I intend to designate gallo-tannin, catechu and tannins of the phlobatannin and the depside groups and the like. Among the proteolytic enzymes which may be employed I may mention pepsin, peptase, papain, brolemin and other similar enzymes which occur in natural products and also proenzymes or zymogens such as pepsinogen.

In carrying out the method in practice the tannin and proteolytic enzyme are merely added to the beverage and agitated thoroughly to bring the same into solution and thorough dispersion. Gallo-tannin has a precipitating effect upon proteolytic enzymes and when this tannin is employed it is preferred to add it to the beverage first and to supply the proteolytic enzyme to the beverage subsequently. Other tannins, particularly catechu have little or no precipitating action on the enzymes so that such tannins and the proteolytic enzymes may be supplied simultaneously to the beverage.

On account of the effective precipitating action of gallo-tannin, it is necessary to carefully limit the amount employed in order to restrict its effect to the precipitation of the complex albuminoids which tend to give rise to haze and sediment. In the case of other tannins, whose activity is considerably less than that of gallo-tannin, particularly catechu, the employment of an amount substantially greater than necessary is not objectionable. The amount of the additions necessary varies considerably, depending upon the albuminoid content of the beverage and the tannin and proteolytic enzyme employed. Gallo-tannic acid may suitably be used in quantities from 1 to 4 grams per 100,000 cc. of beverage. Catechu tannic acid may suitably be employed to the extent of 4 to 12 grams per 100,000 cc. of beverage. The amount of proteolytic enzyme may vary between 0.5 to 3.0 grams per 100,000 cc. of beverage; these quantities relate to proteolytic enzymes having a digesting power of 1:3000 (that is one part by weight of the enzyme is capable of digesting 3000 parts by weight of fresh hard boiled egg albumen). In case the digesting power of the proteolytic enzyme is smaller or larger than that indicated, it is to be understood that the quantity used should be larger or smaller so as to supply the same amount of digestive action.

In addition to the tannin and proteolytic enzyme, a small amount of a reducing agent such as a soluble sulfite, formate, phosphite, hypophosphite or the like, may be added to the beverage. The amount of such salts, preferably sodium salts, may suitably be between 1 and 9 grams per 100,000 cc. of beverage.

The tannin and proteolytic enzyme should be added to the beverage after the same has been hot processed, dealcoholized and cooled and preferably before the final pasteurization, if the beverage is pasteurized. After the addition of the tannin, with or without the proteolytic enzyme and the solution, and dispersion of the tannin throughout the beverage, the latter is allowed to stand for some time, for example, 6 to 12 hours to permit complete precipitation of the precipitable albuminoids. The requisite quantity of proteolytic enzyme may then be added, if such addition was not effected simultaneously with that of the tannin. The beverage is now filtered and may be pasteurized or not depending upon whether it is to be bottled or kegged.

Where catechu or other tannin which is relatively inert towards proteolytic enzymes is employed, the tannin may be added to the solution of proteolytic enzyme in glycerine which is described and claimed in my co-pending application Serial No. 299,444, filed of even date herewith, and the solution may be added to the beverage so as to supply the desired quantities of the tannin and proteolytic enzyme thereto.

A suitable solution may be prepared as follows: 40 grams of pepsin having a digesting power of 1:3000 are mixed with 40 cc. of distilled water at room temperature and the mixture stirred to a smooth paste. 280 cc. of water are added gradually with careful stirring giving a more or less turbid solution of pepsin. To this solution sufficient chemically pure glycerine of high concentration (spec. gr. 1.24) is added to make 900 cc. of solution. 160 grams of catechu are now added while stirring. After the catechu has been dissolved, sufficient concentrated glycerin is added to make one liter of solution. An addition of a suitable reducing substance such as 10 to 20 grams of sodium hypophosphite may be added to the solution for the purpose of imparting to it the property of removing oxygen from the beverage, to which it is added. The solution is added to the cereal beverage at the rate of 25 to 75 cc. per 100,000 cc. of beverage. The solution is dark brown in color and is naturally resistant to the action of light.

I claim:

1. The method of stabilizing cereal beverages, which comprises adding thereto a small quantity of a tannin, thereby precipitating unstable albuminoids, and a small quantity of proteolytic enzyme to prevent subsequent formation of albuminoid precipitate.

2. The method of stabilizing cereal beverages, which comprises adding thereto a small quantity of a tannin, allowing a precipitate of albuminoids to form, filtering the beverage to remove said precipitate, and storing the beverage with a small content of proteolytic enzyme.

3. The method of stabilizing cereal beverages, which comprises adding thereto, after cooling, small amounts of a tannin and proteolytic enzyme, and filtering the beverage.

4. The method of stabilizing cereal beverages, which comprises adding thereto, after cooling, smaller quantities of a tannin and proteolytic enzyme, filtering and pasteurizing the beverage.

5. The method of stabilizing cereal beverages, which comprises adding thereto, after cooling, small quantities of a tannin, proteolytic enzyme and a reducing agent, and filtering the beverage.

6. The method of stabilizing cereal beverages, which comprises adding thereto, after cooling, small quantities of a tannin, proteolytic enzyme and a reducing agent, filtering and pasteurizing the beverage.

7. The method of stabilizing cereal beverages, which comprises adding thereto, after cooling, small quantities of catechu tannin and proteolytic enzyme.

8. The method of stabilizing cereal beverages, which comprises adding thereto, after cooling, small quantities of catechu tannin and proteolytic enzyme, allowing a precipitate to form by the action of the tannin, and filtering said beverage from the precipitate.

9. The method of stabilizing cereal beverages, which comprises adding thereto, after cooling, small quantities of catechu tannin and proteolytic enzyme, allowing a precipitate to form by the action of the tannin, filtering said beverage from the precipitate and pasteurizing the beverage.

10. The method of stabilizing cereal beverages which comprises adding thereto, after cooling, small quantities of catechu tannin, proteolytic enzyme and a reducing agent, and removing the sediment formed by the action of the tannin.

11. The method of stabilizing cereal beverages, which comprises adding thereto a solution containing catechu tannin and a proteolytic enzyme, and filtering the beverage from the precipitate formed by the action of the tannin.

12. The method of stabilizing cereal beverages, which consists in adding thereto, after cooling between 4 and 12 grams of catechu tannin and an amount of proteolytic enzyme having a digesting capacity equal to that of about 0.5 and 3.00 grams of such an enzyme of 1:3000 digesting power per 100,000 cc. of beverage.

13. The method of stabilizing cereal beverages, which consists in adding thereto, after cooling between 4 and 12 grams of catechu tannin and an amount of proteolytic enzyme having a digesting capacity equal to that of about 0.5 and 3.00 grams of such an enzyme of 1:3000 digesting power per 100,000 cc. of beverage, and filtering the beverage from the precipitate formed by the tannin.

14. The method of stabilizing cereal beverages, which consists in adding thereto, after cooling between 4 and 12 grams of catechu tannin and an amount of proteolytic enzyme having a digesting capacity equal to that of about 0.5 and 3.00 grams of such an enzyme of 1:3000 digesting power, per 100,000 cc. of beverage, filtering the beverage from the precipitate formed by the tannin, and pasteurizing the beverage.

15. As a new composition of matter suitable for stabilizing cereal beverages, an intimate mixture of a tannin which is substantially inactive with respect to proteolytic enzyme, and proteolytic enzyme.

16. As a new composition of matter suitable for stabilizing cereal beverages, a solution containing a tannin which is substantially inactive with respect to proteolytic enzyme, and a proteolytic enzyme.

17. As a new composition of matter suitable for stabilizing cereal beverages, a glycerine solution containing a tannin which is substantially inactive with respect to proteolytic enzyme, and a proteolytic enzyme.

18. As a new composition of matter suitable for stabilizing cereal beverages, a glycerine solution containing a tannin which is substantially inactive with respect to proteolytic enzyme, a proteolytic enzyme, and a reducing agent.

In testimony whereof I have hereunto set my hand, this 7th day of August, 1928.

HERMAN HEUSER.